United States Patent [19]
McCaulley et al.

[11] Patent Number: 6,051,296
[45] Date of Patent: Apr. 18, 2000

[54] TRANSPARENT BARRIER COATINGS EXHIBITING REDUCED THIN FILM INTERFERENCE

[75] Inventors: James A. McCaulley, Ringoes; Michael A. Hubbard, Somerset, both of N.J.

[73] Assignee: Hoechst Trespaphan GmbH, Germany

[21] Appl. No.: 09/160,763

[22] Filed: Sep. 24, 1998

Related U.S. Application Data

[63] Continuation of application No. 08/870,575, Jun. 6, 1997, Pat. No. 5,853,830, which is a continuation-in-part of application No. 08/662,839, Jun. 12, 1996, abandoned.

[51] Int. Cl.$^7$ .................................................. B32B 9/04
[52] U.S. Cl. .................................... 428/35.7; 428/446
[58] Field of Search .................................... 428/35.7, 446

[56] References Cited

U.S. PATENT DOCUMENTS

| | | |
|---|---|---|
| 1,949,914 | 3/1934 | Larson . |
| 2,998,328 | 8/1961 | Munger et al. . |
| 3,102,038 | 8/1963 | Fisher, Jr. . |
| 3,130,061 | 4/1964 | McMahon et al. . |
| 3,180,747 | 4/1965 | Patton et al. . |
| 3,282,729 | 11/1966 | Richardson et al. . |
| 3,379,559 | 4/1968 | Gerhardt . |
| 3,492,137 | 1/1970 | Iler . |
| 3,522,066 | 7/1970 | Forsyth . |
| 3,533,816 | 10/1970 | Oken . |
| 3,706,603 | 12/1972 | Vessey et al. . |
| 3,833,406 | 9/1974 | White . |
| 4,036,721 | 7/1977 | Kato ........................................ 204/181 |
| 4,101,050 | 7/1978 | Buckler et al. . |
| 4,178,273 | 12/1979 | Brown . |
| 4,247,576 | 1/1981 | Kutner . |
| 4,466,831 | 8/1984 | Murphey . |
| 4,466,832 | 8/1984 | Yoshimura . |
| 4,503,158 | 3/1985 | Richard . |
| 4,514,456 | 4/1985 | Deal . |
| 4,537,866 | 8/1985 | Gilson . |
| 4,552,791 | 11/1985 | Hahn . |
| 4,681,818 | 7/1987 | Unnam . |
| 4,738,896 | 4/1988 | Stevens ................................ 428/315.9 |
| 4,937,115 | 6/1990 | Leatherman . |
| 4,945,074 | 7/1990 | Blount . |
| 5,049,609 | 9/1991 | Patitsas . |
| 5,055,137 | 10/1991 | Holcombe . |
| 5,128,081 | 7/1992 | Siegel . |
| 5,130,110 | 7/1992 | Rouet . |
| 5,163,003 | 11/1992 | Bosco et al. . |
| 5,183,704 | 2/1993 | Bohrn et al. . |
| 5,238,668 | 8/1993 | Novotny . |
| 5,244,729 | 9/1993 | Harrison et al. . |
| 5,320,800 | 6/1994 | Siegel ........................................ 419/66 |
| 5,344,633 | 9/1994 | Sorensson . |
| 5,354,548 | 10/1994 | Araya . |
| 5,384,192 | 1/1995 | Long et al. . |
| 5,462,779 | 10/1995 | Misiano . |
| 5,491,023 | 2/1996 | Tsai et al. . |
| 5,494,743 | 2/1996 | Woodard et al. . |
| 5,503,820 | 4/1996 | Moffett . |
| 5,560,773 | 10/1996 | Gimvang . |
| 5,565,273 | 10/1996 | Egli . |
| 5,569,561 | 10/1996 | Exnar ........................................ 429/218 |
| 5,575,953 | 11/1996 | Tachizono . |
| 5,853,830 | 12/1998 | McCaulley et al. . |

FOREIGN PATENT DOCUMENTS

| | | |
|---|---|---|
| 16839 70D | 1/1972 | Australia . |
| 993738 | 7/1976 | Canada . |
| 518646 | 12/1992 | European Pat. Off. . |
| 518647 | 12/1992 | European Pat. Off. . |
| 640472 | 8/1994 | European Pat. Off. . |
| 67 779 | 12/1973 | Luxembourg . |
| 1007482 | 10/1965 | United Kingdom . |
| 1424425 | 2/1976 | United Kingdom . |

OTHER PUBLICATIONS

H. van Olphen, "Clay Minerology", *An Intro. To Clay Colloid Chemistry*, 27:69–71 (1963).

H.H. Weldes & K.R. Lange, "Properties of Soluble Silicates", *Indus. Engin. Chem.*, 61(4):29–44 (Apr. 1969).

W. J. Ward et al, "Gas Barrier Improvement Using Vermiculite & Mica in Polymer Film," *J. Membrane Sci.*,55: 173–180 (1991).

J. Seferis, "Refractive Indices of Polymers," in Polymer Handbook, $3^{rd}$ ed., eds. J. Brandrup and E. H. Immergut, pp. VI–453, Wiley, NY (1989).

"Physical Constants of Inorganic Compounds" in Handbook of Chemistry and Physics, $62^{nd}$ ed., eds. R. c. Weast, pp. B115, B135, B143, B150, CRC Press, Boca Raton (1981).

DuPont: "Fireproof Silicate Paints" Product Licensing Index, vol. 78, No. 8458, Havant GB, p. 177 XP002042865.

*Primary Examiner*—Paul R. Michl
*Attorney, Agent, or Firm*—Howson and Howson

[57] ABSTRACT

A vapor barrier coating solution for poly(ethylene terephthalate) (PET) polymeric articles contains a metal polysilicate and transparent nanocrystalline titanium dioxide. The coating reduces interference between light reflected from the top surface of a coated PET polymeric article and the interface between the dried coating and said PET polymeric article. The coated articles are also provided.

13 Claims, 2 Drawing Sheets

FIG. 2

TRANSPARENT BARRIER COATINGS EXHIBITING REDUCED THIN FILM INTERFERENCE

CROSS-REFERENCE TO OTHER APPLICATIONS

This is a continuation of pending U.S. patent application No. 08/870,575, filed Jun. 6, 1997 (now U.S. Pat. No. 5,853,830) which is a continuation-in-part of pending U.S. patent application No. 08/662,839, filed Jun. 12, 1996, now abandoned.

FIELD OF THE INVENTION

The present invention relates generally to silicate-based barrier coatings for polymeric articles.

BACKGROUND OF THE INVENTION

The coating of thermoplastic polymer substrates with moisture resistant barrier coating compositions to provide impermeability to gases such as oxygen, and liquids, is known [See, e.g., U.S. Pat. No. 3,282,729]. Alkali metal polysilicates have long been known as protective coatings that modify the permeability or surface characteristics of polymeric films and other articles [See, e.g., U.S. Pat. Nos. 1,007,482; 1,424,425; 1,949,914; 3,102,038; 3,130,061; 3,180,747; 3,492,137; 3,522,066; 3,533,816 and U.S. Pat. No. 3,706,603].

Lithium (Li), potassium (K) and sodium (Na) polysilicates are used in coatings for a variety of surfaces. For example, Hecht and Iler, Canadian Pat. No. 993,738, describe a gas and liquid-impermeable coating for polymeric substrates comprising lithium polysilicate having a mole ratio of $SiO_2$ to $Li_2O$ of about 1.6 to 4.6.

Titanium dioxide has been added as a pigment to certain coatings. For example, U.S. Pat. No. 2,998,328 refers to a finish or overcoat comprising (1) a reactive liquid component comprising an aqueous solution of an alkali metal silicate and (2) a pigmented blending component. The reactive liquid component dissolves an alkali metal silicate such as sodium silicate, potassium silicate, lithium silicate, or a mixture of such silicates in water. The pigmented blending component may be titanium dioxide. U.S. Pat. No. 3,379,559 refers to a glass container having a metal oxide coating over which is adhered a synthetic resin. The metal oxide may be titanium dioxide. U.S. Pat. No. 3,833,406 refers to a closed container having a desiccant coating applied to its inner surface. The coating may be titanium oxide and the container may be plastic.

U.S. Pat. No. 4,552,791 refers to a container made of an organic resin having improved vapor barrier characteristics. Plating materials may include titanium oxide. U.S. Pat. 5,494,743 refers to antireflective coatings, such as titanium oxide applied to plastic materials.

The refractive indices, n, of poly(ethylene terephthalate) (PET) and polypropylene (PP), both semicrystalline polymers, depend upon the degree of crystallinity, and, because both are birefringent, also depend upon the degree of orientation [J. Seferis, "Refractive Indices of Polymers", in *Polymer Handbook*, 3rd ed., ed. J. Brandrup and E. H. Immergut, pp. VI-453, Wiley, N.Y (1989)]. The phase average refractive indices, n, of the amorphous and crystalline regions of PET are 1.57 and 1.64, respectively. Biaxially-oriented PET, having ~40 percent crystallinity, may be generally said to have a refractive index of approximately 1.6.

The phase average refractive indices, n, of amorphous and crystalline regions of PP are 1.52 and 1.47, respectively. Biaxially-oriented PP film may be generally said to have a refractive index of approximately 1.5.

The alkali metal silicates ($M_2SiO_3$) of lithium ($Li_2SiO_3$), potassium ($K_2SiO_3$) and sodium ($Na_2SiO_3$) have refractive indices, n, of 1.59, 1.52, and 1.52, respectively ["Physical Constants of Inorganic Compounds", in *Handbook of Chemistry and Physics*, 62nd ed., ed. R. C. Weast, pp. B-114, B-136, B-143, B-150, CRC Press, Boca Raton (1981)]. The refractive index of amorphous silica (lechatelierite) is 1.46 ["Physical Constants of Inorganic Compounds", in *Handbook of Chemistry and Physics*, 62nd ed., ed. R. C. Weast, pp. B-114, B-136, B-143, B-150, CRC Press, Boca Raton (1981)]. The refractive index, n, of a dried alkali metal copolysilicate coating of the formula $(Li_2O)_x(K_2O)_{1-x}(SiO_2)_y$, wherein x [the mole fraction of $Li_2O$ in the combined alkali metal oxides ($M_2O$)] is 0.5, and y [the $SiO_2$:$M_2O$ mole ratio] is 3.64, can be calculated to be 1.49. Clearly a coating of approximately this composition is a better match to the refractive index of PP than that of PET.

Vapor barrier metal polysilicate coatings have been noted to have several disadvantages including discoloration and high refractive indices on some polymeric substrates. Although metal polysilicate barrier coating solutions are water clear, the present inventors have found that there is a faint color caused by thin film interference on coated PET substrates. On coated PET bottles this yields a slightly "oily" appearance that is unacceptable to customers.

There remains a need in the art of barrier coatings for new barrier coating compositions and methods which overcome these deficiencies and are widely available as vapor, gas and/or aroma barriers for polymeric articles, e.g. packaging products.

SUMMARY OF THE INVENTION

In one aspect, the present invention provides a vapor, gas, and aroma barrier coating solution for poly(ethylene terephthalate) (PET) polymeric articles which comprises an alkali metal polysilicate and nanocrystalline titanium dioxide. The metal polysilicate can be an individual polysilicate or blends of various alkali metal polysilicates. The solution provides a dried coating that is substantially transparent at a thickness of less than 500 nm and has good vapor, gas and aroma barrier performance.

In another aspect, the invention provides a PET polymeric article, e.g., a film or container, coated with the above-defined solution and characterized by reduced interference between light reflected from the top surface of the dried coating and the interface between the dried coating and the PET article.

In still another aspect, the invention provides a method for producing an improved PET polymeric article comprising coating said PET polymeric article with the coating solution above defined.

In a further aspect, the invention provides a method of making a coating solution for PET polymeric articles comprising the steps of adding up to 25 percent by weight of nanocrystalline $TiO_2$, as a fraction of the total inorganic solids, to an aqueous alkali metal polysilicate barrier coating solution.

Other aspects and advantages of the present invention are described in the detailed description below and in the claims.

DETAILED DESCRIPTION OF THE INVENTION

The present invention overcomes the deficiencies in prior art polyester vapor barrier coatings by providing a metal polysilicate coating containing sufficient nanocrystalline titanium dioxide to reduce the interference between light reflected from the top surface of the dried coating and the interface between the dried coating and the polyester article. (See FIG. 1).

A. Definitions

The term "vapor" implies a liquid at partial pressure, such as water vapor. The term "gas" includes oxygen, nitrogen, carbon dioxide and others. "Aroma" includes those materials which bear a fragrance, for example, menthol and others. For simplicity, as used herein, the term "vapor barrier" can be interpreted to mean a barrier to gases and aromas as well as traditionally defined vapors.

Similarly as used herein, the term "solution" is interpreted to include colloidal dispersions and suspensions. By "colloidal dispersion or suspension" is meant any dispersion or suspension of particles in liquid, the particles being of a size greater than molecular scale that do not settle out. Generally the particle size in a suspension or dispersion of this invention are from about 10 to about 50,000 Angstroms. "Coating solution" as used herein is meant a liquid containing dissolved or suspended solids that do not settle out and which is used to apply said solids to a substrate.

B. Alkali Metal Polysilicates

The alkali metal polysilicate useful in the present invention is generally selected from aqueous lithium polysilicate, sodium polysilicate, or potassium polysilicate and copolysilicate blends of these materials.

According to the present invention, a typical example of a coating composition contains as a suitable metal polysilicate a copolysilicate, i.e., a mixture of two different alkali metal polysilicates characterized by the general formula $(Li_2O)_x(K_2O)_{1-x}(SiO_2)_y$ in which the mole fraction of $Li_2O$ is x and the molar ratio of $SiO_2$ to $M_2O$ is y. In the coating solutions useful in this invention the copolysilicate is preferably one in which y is between 1 and 10 for all x less than or equal to 1. In a preferred copolysilicate for this use, x is between about 0.5 and 1, and y is between about 4.6 and 10.

An exemplary commercially available product bearing the trademark Inobond® Li 2043 (van Baerle & Cie) is an aqueous colloidal suspension of lithium polysilicate which contains ~24.5 percent by weight silicon oxide and ~3 percent by weight lithium oxide. Another useful product bears the trademark K4009 (van Baerle & Cie) and is an aqueous colloidal suspension of potassium polysilicate which contains ~26.8 percent by weight silicon oxide and ~13 percent by weight potassium oxide. Such components are mixed with water to produce a desired solids content for a coating composition of this invention.

Generally, in selection of the metal polysilicates useful in the coating solutions of this invention, where nanocrystalline titanium dioxide is employed, the solution must avoid flocculation of the $TiO_2$. $TiO_2$ has an isoelectric point (iep), i.e., the pH at which the zeta potential is zero, of about 5.9. $TiO_2$ particles form stable sols at a pH of about 10, the pH of the copolysilicate barrier coating described herein. This stability can be compromised by the presence of cations that accumulate in the Stem layer, reduce the zeta potential of the particles and thereby lower the coulombic repulsion barrier to flocculation. The effectiveness of cations in causing flocculation is expressed as the critical flocculation concentration. This is the concentration above which flocculation is rapid. Divalent and trivalent metal ions from the selected polysilicates can cause flocculation at very low concentrations and must be avoided in the coating solutions of the present invention. Monovalent metal ions typically have higher critical flocculation concentrations than multivalent metal ions. In the present copolysilicate solutions containing lithium and potassium ions, potassium is expected to be much more destabilizing than lithium. Thus there is an incentive to use only lithium polysilicate when preparing barrier coating solutions containing $TiO_2$. Other factors, however, favor the use of potassium polysilicate. Therefore, the formulation of the coating solution must balance these factors. Avoidance of flocculation also favors dilute solutions over concentrated solutions. One of skill in the art may readily adjust the value of x and y in the copolysilicate $(Li_2O)_x(K_2O)_{1-x}(SiO_2)_y$ as well as the weight fraction $TiO_2$, z, of total inorganic solids in a coating solution containing both nanocrystalline $TiO_2$ and alkali metal copolysilicate in order to achieve balance in the properties described above. The selection of other suitable metal polysilicates for the coating solutions of this invention is within the skill of the art, given the teachings herein.

C. Titanium Dioxide

Titanium dioxide, $TiO_2$, exists in two commercially available crystal structures, anatase and rutile. Both forms have anisotropic refractive indices. The direction-weighted average refractive index, n, of rutile is 2.7; that of anatase is 2.5. Neither form absorbs visible light and therefore both are transparent. However, because $TiO_2$ powders have large refractive indices, they scatter visible light efficiently at all wavelengths. For this reason titanium dioxide powder, especially rutile $TiO_2$ with its higher refractive index, is commonly used as a white pigment in paints, plastics, etc. [J. Braun, "White Pigments", *Federation Series on Coating Technology*, Blue Bell, Pa. (1995)]. Because $TiO_2$ can cause photocatalytic degradation of organic materials (e.g., paint), pigment grade $TiO_2$ powder is commonly encapsulated in an inert material (e.g., $SiO_2$ or $Al_2O_3$). The presence of a surface coating can have profound effects on the stability, with respect to agglomeration, of colloidal $TiO_2$ particles in metal polysilicate barrier coating solutions. This sensitivity to surface coating can be mitigated by use of dispersants.

Typical pigment grades of $TiO_2$ have an average particle size of 250 nm. More recently subpigmentary grades of nanocrystalline $TiO_2$ have become commercially available. These grades have average particle sizes <50 nm and are not widely used as white pigments. Nanocrystalline $TiO_2$ is attractive for the present invention because it has an average particle size that is small compared to the thickness (200 to 300 nm) of a typical metal polysilicate barrier coating layer. According to this invention, nanocrystalline $TiO_2$ with an average particle size of <100 nm, and preferably <50 nm is added to metal polysilicate barrier coatings to minimize thin film interference between light scattered off the surface of the barrier layer and that reflected off the interface between the barrier layer and the polymeric substrate.

An average refractive index of a $TiO_2$-containing metal polysilicate layer can be calculated using a Lorents-Lorenz relationship [Y. Yan et al, *Chem. Mater.*, 7:2007–2009 (1995)]

$$\frac{n^2C-1}{n^2C+2} = V_{MPS}\left(\frac{n^2MPS-1}{n^2MPS+2}\right) + V_{TiO2}\left(\frac{n^2TiO2-1}{n^2TiO2+2}\right)$$

where $n_{MPS}$, $V_{MPS}$, $n_{TiO2}$, $V_{TiO2}$, and $n_{TiO2}$ are the refractive index, n, and volume fraction, V, of metal polysilicate (subscript MPS) and $TiO_2$ in the dried coating (subscript c). The reflectance of light impinging at normal incidence on the interface between the dried coating and a PET substrate can be calculated using the formula $$R = \frac{(n_c - n_{PET})^2}{(n_c - n_{PET})}$$

Figure 2:
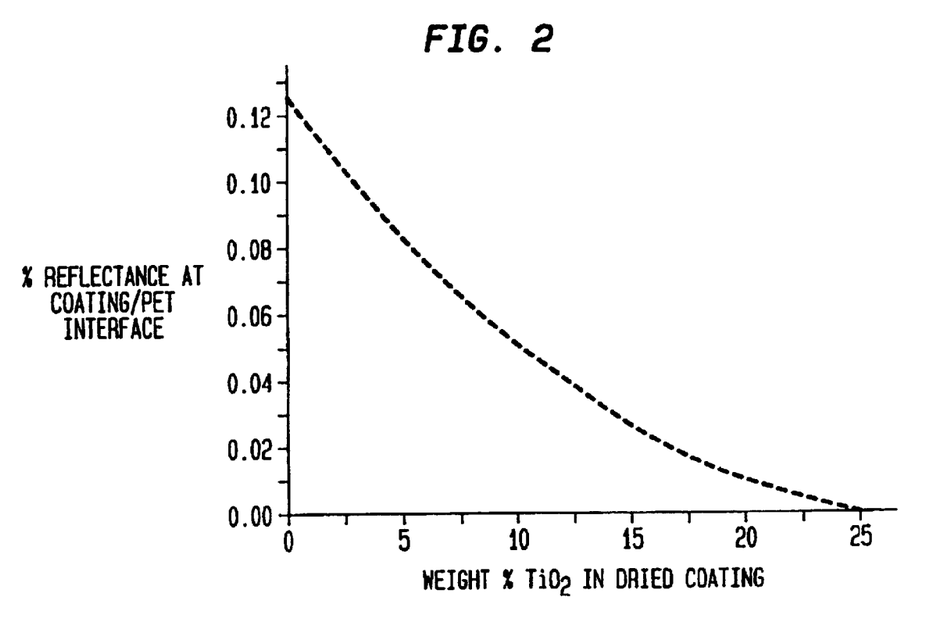
FIG. 2 is a graph of the theoretical reflectance at the interface between the coating and substrate of light impinging at normal incidence. This shows that the normal incidence reflectance decreases with increasing nanocrystalline $TiO_2$ content. Similar curves are expected for other angles of incidence.

In this model of the present invention, addition of nanocrystalline $TiO_2$ to a metal polysilicate reduces thin film interference by reducing the reflectance at the coating/substrate interface as shown in FIG. 2.

Because $TiO_2$ is a very effective white pigment, adding little $TiO_2$ to the coating solution yields a milky white dispersion. However, the coating solutions of the present invention, when applied to a polyester substrate, yield a dried coating that is substantially transparent at thicknesses less than 500 nm, with reduced color from thin film interference. Barrier performance is compromised to only a small degree. Thus, nanocrystalline $TiO_2$ is useful as a filler in metal polysilicate barrier coatings to obtain a water clear coating on PET with reduced thin film interference and satisfactory barrier performance. One exemplary commercially available nanocrystalline $TiO_2$ product is supplied by Johnson Matthey and is the anatase form of $TiO_2$ with an average particle size of about 32 nm.

Figure 1:
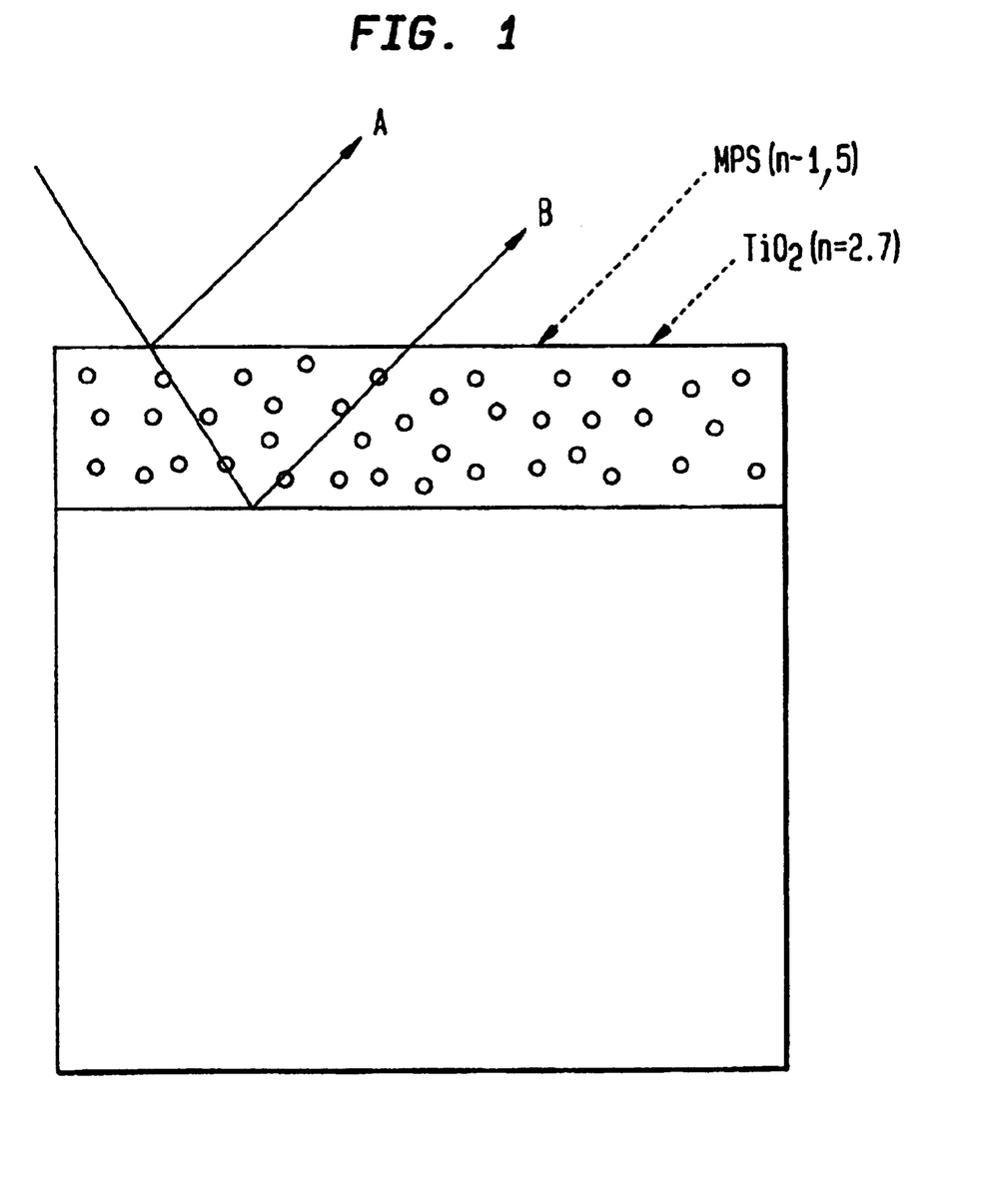
FIG. 1 is a schematic diagram showing reflection at the coating surface (A) and at the interface between the coating and substrate (B). $TiO_2$ particles are not shown to scale and the drawn light rays do not accurately represent refraction at the air/coating interface.

It should be noted that the model presented in FIGS. 1 and 2 ascribes the reduction of thin film interference in the present invention to decreased reflectance at the coating/substrate interface. Another mechanism which may be operative is that light rays passing through the coating layer (B) are scattered off $TiO_2$ particles, thereby preventing their constructive or destructive interference with light reflected off the air/coating interface (A). As long as this scatter within the coating does not significantly increase the haze level, it is acceptable.

D. Optional Surfactants

The coating compositions of this invention may also contain a suitable surfactant to reduce surface tension. Preferably, the surfactant is nonionic. The surfactant selected should possess a critical micelle concentration sufficiently low to ensure a dried coating whose gas, vapor and aroma barrier properties are not compromised. Most preferably, the surfactant is selected from the group consisting of acetylenic diols and alkyl ethoxylates. One exemplary commercially available acetylenic diol bears the trademark Genapol® 26-L-60N (Hoechst Celanese). Two exemplary commercially available alkyl ethoxylates bear the trademarks Genapol® UD050 (Hoechst Celanese) and Dynol® 604 (Air Products). The amount of surfactant added to the coating composition will depend on the particular surfactant selected, but should be the minimum amount of surfactant that is necessary to achieve the uncompromised dried coating. For example, typical surfactant amounts can be less than 0.1 percent by weight of an acetylenic diol or an alkyl ethoxylate.

E. Method of the Invention

The $TiO_2$-containing metal polysilicate coatings of the invention can be applied on a variety of polyester polymeric articles and surfaces to improve (i.e., reduce) interference between light reflected from the top surface of a coated polyester article and the interface between the dried coating and the polyester article. These coatings are particularly advantageous where the polymers used to prepare these articles do not provide sufficient gas impermeability for the desired application. Such polymers which are themselves characterized by high refractive indices and which are therefore suitable substrates for this barrier coating include all polyesters, but primarily poly(ethylene terepbthalate) (PET), which is popularly used in containers and packages of foodstuffs. Typically, PET films are biaxially oriented, depending on the customer requirements. Especially preferred articles for coating with the composition of the present invention include polymeric films, polymeric sheets, rigid and semi-rigid containers, bottles, jars, blisterpacks and lidstocks, made of the foregoing polyesters.

A coating solution of the invention may be prepared as follows, using, if desired, commercially available lithium polysilicate and potassium polysilicate solutions. For example, either a commercially available colloidal suspension of lithium polysilicate or a commercially available potassium polysilicate colloidal suspension, or both, are mixed with water to produce a colloidal suspension of a desired weight percent solids. Optionally, a surfactant may be added at this stage to reduce surface tension of the coating mixture. Nanocrystalline $TiO_2$ is then added at an amount of up to 25 percent by weight of the total inorganic solids of the solution.

A typical useful solids content of an $TiO_2$-containing metal polysilicate barrier coating solution of this invention is from about 2 percent to about 20 percent by weight. The desired solids content depends entirely on the coating method used, and may be adjusted to achieve a thickness of between about 100 nm to about 500 nm of the dry coating. Preferably, where the components of the coating solution are $TiO_2$ and lithium polysilicate, the solids content is between 2 to 8 percent by weight. Such an adjustment is well within the skill of the art [see, e.g., Canadian Pat. No. 993,738].

The polyester articles to be coated by the compositions of the invention may be previously untreated. Optionally, the polymeric article, such as a film or bottle, may be first plasma treated to improve wetting and adhesion by the barrier coating. Alternatively, the polymeric article may be corona-treated by the industry-wide corona discharge treatment method. In instances where corona-treatment of the polymer does not cause suitable wetting of the coating on the polymer, a suitable primer may be first applied to the polymeric article.

After a period of stirring, the barrier coating mixture is ready to be applied to a polymeric surface. Conventional coating techniques may be used. These techniques include, but are not limited to, roll, rod, reverse roll, forward roll, air knife, knife over roll, blade, gravure and slot die coating methods. General descriptions of these types of coating methods may be found in texts, such as *Modern Coating and Drying Techniques*, (E. Cohen and E. Gutoff, eds; VCH Publishers) New York (1992) and *Web Processing and Converting Technology and Equipment*, (D. Satas, ed; Van Nostrand Reinhold) New York (1984). Three-dimensional articles may be coated by spray coating or dip coating. The method of application is not a limitation on the present invention, but may be selected from among these and other well-known methods by the person of skill in the art.

After coating, the coated product must be dried at a selected temperature of room temperature or greater than room temperature. The selection of the drying temperature depends on the desired time for drying; that is, accelerated drying times may be achieved at elevated temperatures which would not be necessary if a longer time period for drying was acceptable. One of skill in the art can readily adjust the oven temperature and exposure time as desired. The performance of the dried barrier coating is insensitive to the drying temperature range between about 25° C. and about 200° C.

The following examples illustrate the preferred compositions and methods of the invention. These examples are illustrative only and do not limit the scope of the invention. The examples show that coating solutions according to this invention yield a dried coating that is substantially transparent at a thickness of less than 500 nm. As shown in the examples below, metal silicate barrier coating solutions containing up to 9 percent of nanocrystalline $TiO_2$ (as a fraction of the total solids) have been shown to yield water clear coatings on PET with good barrier performance, reducing, but not eliminating, thin film interference.

EXAMPLE 1 PREPARATION AND CHARACTERIZATION OF COATED ARTICLES

A series of lithium-potassium copolysilicate barrier coating solutions containing nanocrystalline $TiO_2$ were prepared, as indicated in Table 1. The composition of the metal copolysilicate used in coating of the example is described by the general formula $(Li_2O)_x(K_2O)_{1-x}(SiO_2)_y$, the mole fraction of $Li_2O$ in the combined alkali metal oxides ($M_2O$) is 0.5 and y, the molar ratio of $SiO_2$ to $M_2O$ is 3.64.

TABLE 1

Recipes for Preparing Metal Polysilicate Barrier Coatings Containing Nanocrystalline $TiO_2$

| Solution | Mass of Inobond® Li2043 (g) | Mass of Inobond® K-4009 (g) | Mass of $H_2O$ (g) | Mass of $TiO_2$ (g) | Mass of 1.0% Dynol® 604 (g) | Ultrasound | Filter |
|---|---|---|---|---|---|---|---|
| A | 14.36 | 10.44 | 74.50 | 0.79 | 1.01 | Yes | No |
| B | 14.21 | 10.53 | 74.60 | 0.80 | 1.03 | No | No |
| C | see A | see A | see A | see A | see A | Yes | Yes |
| D | see B | see B | see B | see B | see B | No | Yes |
| E | 11.92 | 8.71 | 53.62 | 0 | 0.75 | No | Yes |

The composition of the coating in this example is further described by the weight percent, z, of $TiO_2$ as a fraction of the total inorganic solids in the solution and the total weight percent of inorganic in the coating suspension. In this example, z is 9 percent and the total weight percent of inorganic solids is 8.8 percent. Thus, the coating solution of this example is one in which 9 percent of the total solids is $TiO_2$ and 91 percent of the total solids is lithium-potassium copolysilicate.

With continuous stirring, Inobond® Li2043 (van Baerle & Cie) lithium polysilicate having 3.0 weight percent $Li_2O$ and 24.5 weight percent $SiO_2$ was mixed with water. K-4009 (van Baerle & Cie) potassium polysilicate having 13.0 weight percent $K_2O$ and 26.85 weight percent $SiO_2$ was added to the lithium polysilicate solution. Dynol® 604 nonionic surfactant, as a 1 weight percent solution, was then added to improve the wetting of the poly(ethylene terephthalate) (PET) substrate. Nanocrystalline, anatase $TiO_2$ (Johnson-Matthey) was added to the polysilicate solution with stirring. Coating suspensions were stirred well immediately prior to film coating.

The apparent particle size of the $TiO_2$ powder as received was clearly greater than 30 nm, indicating that the nanoscale particles were agglomerated. To reduce this agglomeration, one sample (A) was subjected to ultrasound (5 min at 50 percent power in a Branson Sonifier® 250). Half of the ultrasonic-treated "solution" was filtered through Celite® diatomaceous earth (6 g in a 150 $cm^3$ coarse Buchner funnel) to produce sample C. Likewise, half of the sample not subjected to ultrasound, B, was filtered to obtain sample D. A control sample, E, not containing $TiO_2$ was also used.

Four inch circles were cut from Hostaphan® 2400, PET film (Hoechst Diafoil, 0.5 mil thick) with a scalpel. Any dust on the film was blown off with a jet of clean, filtered air. The samples were then plasma treated to improve wetting by metal polysilicate coating solutions and adhesion of dried metal polysilicate coatings. Plasma treatment was performed using a Plasma Preen® microwave reactor operated at 50 percent power with 2 Torr of oxygen; the treatment duration was 5 s.

Approximately 10 g of coating solution was dispensed on the PET film before spinning at 2000 rpm for 10 s. The coated films were dried at 50° C. for ~30 s. Several coated samples were prepared with each coating solution described in Table 1. From these, separate samples were selected for accelerated aging/haze measurements and oxygen transmission rate (OTR) measurements.

Optical haze was measured with a spectrophotometer (MacBeth Color-eyes® 7000) conforming to ASTM D 1003-61. Oxygen transmission rate measurements were performed using a Mocon Oxtran® 2000 instrument.

Table 2 presents the measured haze and OTR values for a series of PET films coated with nanocrystalline $TiO_2$-containing metal polysilicate. Samples coated with coating solutions A, B, C, and D contain $TiO_2$, whereas the sample coated with coating solution E does not.

TABLE 2

Oxygen Transmission Rates and Percent Haze Results for Nanocrystalline $TiO_2$-Containing Metal Polysilicate Barrier Coatings on 0.5 mil Thick PET Film

| Coating Solution Used | OTR ($cm^3$/[$m^2$ day atm] 30° C. & 0% RH) | Hase (%) |
|---|---|---|
| A | 2.9 | 6.9 |
| B | 2.1 | 5.8 |
| C | 3.2 | 5.2 |
| D | 2.2 | 4.6 |
| E | 1.4 | 4.4 |
| None | ~160 | 4.8 |

Within experimental uncertainty of the example, most of the samples have approximately the same percentage level of haze, which is essentially identical to that of uncoated PET film. Thus, while the coating solutions are milky white, the resultant dry coatings are water clear and exhibit good barrier performance. Neither ultrasonic treatment nor filtering had a great effect on dry coating clarity. Visual comparison of samples prepared from solutions A and E reveals that thin film interference is reduced, but not fully eliminated on film A.

EXAMPLE 2 CALCULATION OF CONTROLLED REFRACTIVE INDEX

FIG. 1 depicts the rays reflected from the top surface of the coating (A) and the coating/film interface (B). Interference, which varies with wavelength, between these rays causes the slight color observed on metal polysilicate coated PET film and bottles. This interference depends on the reflectance at the coating/film interface. This reflectance can be calculated if the refractive index of the coating and that of the PET substrate are known. Using the Lorenz-Lorentz relationship, the refractive index of nanocrystalline $TiO_2$-containing metal polysilicates is calculated using indices of refraction, n=1.59 for the metal polysilicate and n=2.7 for rutile $TiO_2$. These figures are then substituted into the expression for the reflectance at an interface (normal angle of incidence) to obtain the curve shown in FIG. 2. Similar curves are expected for other angles of incidence.

These calculations indicate that reflectance (at normal incidence) at the metal polysilicate/PET interface is decreased by a factor of two when 10 percent $TiO_2$ is added. This is consistent with visual inspection of coatings of this invention, which exhibit reduced color from thin film interference.

EXAMPLE 3 FLOCCULATION OF $TiO_2$ IN LITHIUM-POTASSIUM COPOLYSILICATE BARRIER COATING SOLUTIONS

A critical factor in preparing coating solutions according to this invention is the prevention of $TiO_2$ flocculation. Three grades of nanocrystalline $TiO_2$ were evaluated for their proclivity to flocculate in metal copolysilicate coating solutions of composition $(Li_2O)_x(K_2O)_{1-x}(SiO_2)_y$, wherein x=0.5, y=3.64 and the total solids level, including $TiO_2$, was 8 percent by weight.

The grades of $TiO_2$ tested were:

(a) TTO 55N (Ishihara Corporation) a pure nanocrystalline rutile $TiO_2$ powder with average particle diameter of 35 nm;

(b) TTO 51A (Ishihara Corporation) a nanocrystalline rutile $TiO_2$ encapsulated with $Al_2O_3$ and having an average particle size of 20 nm; and (c) TTO 55A (Ishihara Corporation) a nanocrystalline rutile $TiO_2$ encapsulated with $Al_2O_3$ and having an average particle size of 35 nm.

When added to the metal polysilicate solution at levels such that z, the weight fraction $TiO_2$ of total inorganic solids varied between 5 and 20 percent, the alumina-encapsulated $TiO_2$ grades (b) and (c) were observed to flocculate far more severely than $TiO_2$ grade (a). This is likely due to the fact that the isoelectric point of $Al_2O_3$ occurs at pH 8.9, too close to that of the metal polysilicate coating solutions of the present invention. Thus, alumina-encapsulated $TiO_2$ powders in the absence of dispersants are not suitable for use in the high pH environment of the coating solutions of the invention.

EXAMPLE 4 VARIATION OF THE WEIGHT FRACTION OF NANOCRYSTALLINE ANATASE $TiO_2$ IN METAL POLYSILICATE COATINGS

A series of lithium-potassium copolysilicate barrier coating solutions containing nanocrystalline anatase $TiO_2$ was prepared according to the recipes in Table 3 and the procedure in Example 1.

TABLE 3

Recipes for Preparing Lithium-Potassium Copolysilicate Barrier Coatings Containing Nanocrystalline $TiO_2$

| Mass of K-4009 (g) | Mass of Inobond ® Li 2043 (g) | Mass of $H_2O$ (g) | Mass of $TiO_2$ (g) | Mass of 1% Dynol ® 604 solution (g) | Percent $TiO_2$ in Dried Coating |
|---|---|---|---|---|---|
| 10.32 | 14.14 | 74.54 | 0.0 | 1.0 | 0 |
| 9.80 | 13.44 | 75.36 | 0.4 | 1.0 | 5 |
| 9.28 | 12.73 | 76.19 | 0.8 | 1.0 | 10 |
| 8.77 | 12.02 | 77.01 | 1.2 | 1.0 | 15 |
| 8.25 | 11.31 | 77.83 | 1.6 | 1.0 | 20 |

Circles of Hostaphan® 2400, PET film, (0.5 mil thick) were prepared and coated with the coating solutions of Table 3 as described in Example 1. Oxygen transmission rate measurements were performed on a Mocon OxTran® 2000 instrument at 30° C. and 0 percent relative humidity. Table 4 presents the oxygen transmission rate data for the five samples of this example.

TABLE 4

Oxygen Transmission Rates of Nanocrystalline $TiO_2$-Containing Metal Polysilicate Barrier Coatings on 0.5 mil Thick PET Film

| Weight Percent $TiO_2$ in Dried Coating | OTR $cm^3/[m^2$ day atm] at 30° C. & 0% RH |
|---|---|
| 0 | 2.3 |
| 5 | 4.3 |
| 10 | 102 |
| 15 | 103 |
| 20 | 116 |

These results, taken with those of Example 1, indicate severe loss of barrier performance at $TiO_2$ loadings around 10 percent as a fraction of the total solids in a lithium-potassium copolysilicate coating. This is probably due to flocculation.

EXAMPLE 5 PREPARATION AND CHARACTERIZATION OF COATED ARTICLES

An alternate method of preparing coating solutions of the invention is to use a previously-made dispersion of nanocrystalline $TiO_2$, rather than adding powder to a polysilicate barrier coating solution. Such a dispersion may be purchased or prepared as a separate step in preparing the coating solution of this invention.

A series of lithium polysilicate barrier coating solutions containing nanocrystalline $TiO_2$ was prepared using the commercial submicron $TiO_2$ dispersion (UVCW 30, Daniel Products). This dispersion contains 30% w/w $TiO_2$ in a mixture of water and propylene glycol. The number-averaged $TiO_2$ particle size of this dispersion was measured to be 97 nm; only 25% of the particles were found to be less than 55 nm in diameter. Preferred coating solutions of the present invention use $TiO_2$ with smaller particle size, less than 50 nm. The barrier coating solutions prepared according to Table 5 were all milky white.

TABLE 5

Recipes for Preparing Lithium Polysilicate Barrier Coatings Containing Nanocrystalline $TiO_2$

| Mass of Inobond ® Li 2043 (g) | Mass of $H_2O$ (g) | Mass of $TiO_2$ Dispersion (g) | Percent $TiO_2$ in Dried Coating |
|---|---|---|---|
| 43.60 | 56.40 | 0.0 | 0 |
| 41.46 | 56.53 | 2.01 | 5 |
| 39.23 | 56.78 | 4.02 | 10 |
| 37.14 | 56.96 | 6.03 | 15 |
| 34.92 | 57.07 | 8.10 | 20 |
| 32.75 | 57.27 | 9.94 | 25 |
| 30.59 | 57.47 | 12.02 | 30 |

Circles of Hostaphan® 2400, PET film, (0.5 mil thick) were prepared and coated with the coating solutions of Table 5 as described in Example 1. Oxygen transmission rate measurements were performed on a Mocon OxTran® 2000 instrument at 23° C. and 50% relative humidity. Table 6 presents the oxygen transmission rate data for the samples of this example. An uncoated Hostaphan® 2400 PET film (~0.5 mil thick) had an OTR of 94.7 $cm^3/[m^2$ day atm] at 23° C. and 50% RH.

TABLE 6

Oxygen Transmission Rates of Lithium Polysilicate Barrier Coatings Containing Nanocrystalline $TiO_2$ on 0.5 mil Thick PET Film

| Weight Percent $TiO_2$ in Dried Coating | OTR $cm^3/[m^2$ day atm] at 23° C. & 50% RH |
|---|---|
| 0 | 1.1 |
| 5 | 0.49 |
| 10 | 1.3 |
| 15 | 1.1 |
| 20 | 2.3 |
| 25 | 3.7 |
| 30 | 39.9 |

All references and patents cited above are incorporated herein by reference. Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. A gas, vapor and aroma barrier coating solution for polymeric substrates consisting of:
   (a) an aqueous metal polysilicate solution;
   (b) nanocrystalline titanium dioxide having an average particle size of less than about 100 nm; and
   (c) up to about 1% by weight of an organic surfactant; wherein said coating solution has an inorganic solids content of from about 2 to 20% by weight, and wherein the nanocrystalline titanium dioxide is present in said coating solution at about 9% or less by weight of said inorganic solids content.

2. The solution according to claim 1 wherein said metal polysilicate is selected from the group consisting of lithium polysilicate, sodium polysilicate, potassium polysilicate and copolysilicate blends thereof.

3. The solution according to claim 1 wherein said metal polysilicate is a copolysilicate of lithium and potassium of the formula $(Li_2O)_x(K_2O)_{1-x}(SiO_2)_y$ wherein x is between 0 and 1 and y is between 1 and 10.

4. The solution according to claim 1, which yields a dried coating that is substantially transparent at a thickness of less than 500 nm.

5. The solution according to claim 1 wherein said nanocrystalline $TiO_2$ has an average particle size of less than about 100 nm.

6. The solution according to claim 1 wherein said nanocrystalline $TiO_2$ has an average particle size of less than about 50 nm.

7. The solution according to claim 1 wherein said nanocrystalline $TiO_2$ is rutile.

8. The solution according to claim 1 wherein said nanocrystalline $TiO_2$ is anatase.

9. The solution according to claim 1 wherein said nanocrystalline $TiO_2$ is up to 25 percent by weight of total inorganic solids in said solution.

10. The solution according to claim 3, wherein x is between 0.5 and 1 and y is between 4.6 and 10.

11. The coating solution according to claim 1, wherein the surfactant is nonionic and possesses a critical micelle concentration sufficiently low to ensure a dried coating uncompromised by residual surfactant.

12. The coating solution according to claim 11, wherein the surfactant is selected from the group consisting of acetylenic diols and alkyl ethoxylates.

13. A method of making a coating solution for poly (ethylene terephthalate) articles consisting of the steps of:
   adding to an aqueous alkali metal polysilicate solution, nanocrystalline $TiO_2$ and an organic surfactant, wherein said coating solution has a total inorganic solids content of from about 2 to 20% by weight, and said nanocrystalline $TiO_2$ is added in an amount of up to 9 weight percent of said total inorganic solids, and said surfactant is added at up to approximately 1% by weight of said coating solution.

* * * * *

UNITED STATES PATENT AND TRADEMARK OFFICE
CERTIFICATE OF CORRECTION

PATENT NO. : 6,051,296
DATED : April 18, 2000
INVENTOR(S) : James A. Mc Caulley and Micheal A. Hubbard It is certified that error appears in the above-identified patent and that said Letters Patent is hereby corrected as shown below:

Column 4,
Line 5, replace "Stem" with --Stern--.

Column 5,
Line 5, delete the formula "

$$\frac{n^2 C - 1}{n^2 C + 2} = V_{MPS} \left[ \frac{n^2 MPS - 1}{n^2 MPS + 2} \right] + V_{TiO2} \left[ \frac{n^2 TiO2 - 1}{n^2 TiO2 + 2} \right]$$

" and insert in place thereof, the formula --

$$\frac{n^2_C - 1}{n^2_C + 2} = V_{MPS} \left[ \frac{n^2_{MPS} - 1}{n^2_{MPS} + 2} \right] + V_{TiO2} \left[ \frac{n^2_{TiO2} - 1}{n^2_{TiO2} + 2} \right] --.$$

Column 7,
Line 27, after "$(Li_2O)_x(K_2O)_{1-x}(SiO_2)_y$ "insert -- wherein x --;
Line 43, in Table 1, row 1, column 3, delete "Mass of Inobond ® K-4009" and insert in place thereof --Mass of K-4009 --.

UNITED STATES PATENT AND TRADEMARK OFFICE
CERTIFICATE OF CORRECTION

PPATENT NO. : 6,051,296
DATED : April 18, 2000
INVENTOR(S) : James A. Mc Caulley and Micheal A. Hubbard It is certified that error appears in the above-identified patent and that said Letters Patent is hereby corrected as shown below:

Column 8,
Line 48, in Table 2, row 1, column 3, delete "Hase" and insert in place thereof --Haze--.

Column 9,
Line 2, replace "film" with --films--.
Line 48 delete " such that z, the" and insert in place thereof --such that the --.

Signed and Sealed this

Nineteenth Day of June, 2001

*Attest:*

NICHOLAS P. GODICI
*Attesting Officer*     *Acting Director of the United States Patent and Trademark Office*